(12) United States Patent
Klar et al.

(10) Patent No.: US 9,131,349 B2
(45) Date of Patent: Sep. 8, 2015

(54) APPARATUS FOR TRANSMITTING LOCATION BASED MESSAGES FROM VEHICLES TO STATIONARY INFRASTRUCTURE

(71) Applicant: Hanning & Kahl GmbH & Co. KG, Oerlinghausen (DE)

(72) Inventors: Georg Klar, Hiddenhausen (DE); Christian Schmidt, Bielefeld (DE)

(73) Assignee: Hanning & Kahl GmbH & Co. KG, Oerlinghausen (DE)

( * ) Notice: Subject to any disclaimer, the term of this patent is extended or adjusted under 35 U.S.C. 154(b) by 0 days.

(21) Appl. No.: 14/348,214

(22) PCT Filed: Oct. 10, 2012

(86) PCT No.: PCT/EP2012/070056
§ 371 (c)(1),
(2) Date: Mar. 28, 2014

(87) PCT Pub. No.: WO2013/057024
PCT Pub. Date: Apr. 25, 2013

(65) Prior Publication Data
US 2014/0235272 A1    Aug. 21, 2014

(30) Foreign Application Priority Data
Oct. 21, 2011    (DE) .................... 20 2011 051 720 U

(51) Int. Cl.
*H04W 24/00*    (2009.01)
*H04W 4/04*    (2009.01)
(Continued)

(52) U.S. Cl.
CPC ............... *H04W 4/046* (2013.01); *B61L 11/08* (2013.01); *B61L 25/023* (2013.01); *B61L 25/025* (2013.01); *H04W 4/026* (2013.01)

(58) Field of Classification Search
CPC ..... H04W 4/026; H04W 4/021; H04W 4/027; H04W 4/046; B61L 11/08; B61L 25/023
USPC ........................................................ 455/456.1
See application file for complete search history.

(56) References Cited

U.S. PATENT DOCUMENTS

| 5,420,883 A | 5/1995 | Swensen et al. |
| 2005/0010338 A1* | 1/2005 | Kraeling et al. ................ 701/19 |

(Continued)

FOREIGN PATENT DOCUMENTS

| DE | 10336084 A1 | 3/2005 |
| DE | 102009060728 A1 | 6/2011 |

(Continued)

OTHER PUBLICATIONS

Secondary Surveillance Radar, Wikipedia, Sep. 23, 2011.
(Continued)

*Primary Examiner* — Barry Taylor
(74) *Attorney, Agent, or Firm* — Richard M. Goldberg

(57) ABSTRACT

Apparatus for transmitting location based messages from vehicles (10) to a stationary infrastructure (14, 16), including at least one transponder (20) installed on a vehicle (10), at least one stationary base (18) in the form of a transceiver for exchanging signals with the transponder (20), a device (22) for measuring run times of the signals and for calculating the distance between the base (18) and the transponder (20), and an evaluation system (24) for evaluating the messages contained in the signals from the transponder (20) on the basis of the measured distance.

6 Claims, 1 Drawing Sheet

(51) Int. Cl.
*B61L 11/08* (2006.01)
*B61L 25/02* (2006.01)
*H04W 4/02* (2009.01)

(56) References Cited

U.S. PATENT DOCUMENTS

2005/0152142 A1* 7/2005 Traynor .................. 362/249
2009/0299623 A1* 12/2009 Weiler .................... 701/203
2010/0001896 A1* 1/2010 Fiereizen ................. 342/42

2011/0207476 A1 8/2011 Qahwash et al.

FOREIGN PATENT DOCUMENTS

EP 2085287 A1 8/2009
WO 2011/076516 A1 6/2011

OTHER PUBLICATIONS

Transponder, Wikipedia, Oct. 9, 2011.

* cited by examiner

APPARATUS FOR TRANSMITTING LOCATION BASED MESSAGES FROM VEHICLES TO STATIONARY INFRASTRUCTURE

BACKGROUND OF THE INVENTION

The invention relates to an apparatus for transmitting location based messages from vehicles to a stationary infrastructure, comprising at least one transponder mounted on a vehicle, and at least one stationary base in the form of a transceiver for exchanging signals with the transponder.

In public local traffic there is frequently a need to transmit messages from the vehicles to a stationary infrastructure. As examples, the transmission of point actuating commands from trams to a point adjusting device or the transmission of priority requests from busses or emergency vehicles to a traffic light system may be mentioned. These commands and requests are location based in the sense that they are admissible only when the corresponding vehicle is present at a certain location or within a certain area.

Conventional apparatus of this type use transponders and transceivers that have only a very short range. For rail vehicles, the transceiver is typically installed within the track, whereas the associated transponder is mounted in the vicinity of the bottom of the vehicle. Then, communication is possible only at the moment at which the vehicle passes over the transceiver. In this way, it is assured that the point actuating command, for example, can only be issued when the vehicle is found at the specified location.

SUMMARY OF THE INVENTION

It is an object of the invention to provide an apparatus of the type indicated above which offers a greater amount of flexibility.

According to the invention, this object is achieved by a device for measuring run times of the signals and for calculating the distance between the base and the transponder, and an evaluation system for evaluating the messages that are contained in the signals from the transponder on the basis of the measured distance.

In this apparatus, the transceiver has a greater range, e.g. several 10 m or several 100 m, and it forms a so-called base that may be installed at a greater distance from the location or locations from which the messages shall be transmitted. In case of rail vehicles, this has the advantage that no installation work in the track is required. Moreover, the number of bases may be reduced because one base may serve a plurality of admissible transmission locations for the vehicles. Since, however, the communication between the base and the transponder may then take place also when the actual position of the vehicle is not an admissible location for transmission, additional information is required, i.e. information on the location where the vehicle is found at the instant when the message is transmitted. According to the invention, this position information is provided by measuring, e.g. on the side of the base, the run times of the signals that are exchanged between the base and the transponder. Then, the distance between the base and the transponder may be calculated from the measured signal run time. The possible routes of the vehicles and the locations of the bases being known, the distance information may directly be transformed into the required position information. Then, the evaluation system has the task to evaluate the messages transmitted from the vehicles in view of the locations of these vehicles. In this way, it can for example be confirmed whether a rail vehicle that sends a point actuating command is located within a range that is admitted for issuing this command. If not, the command is ignored.

It is an essential advantage of the invention that the locations along the track from which valid messages, commands or requests may be sent, can be configured and changed flexibly because, to that end, it is only necessary to suitably program the evaluation system, and no changes in the installed hardware are necessary. In particular, it is also possible in this way to define longer stretches of the track within which a valid command may be issued.

Advantageous embodiments of the invention are indicated in the dependent claims.

In a preferable embodiment, the travelling direction of the vehicle is also measured by means of repeated distance measurements, so that the direction of travel may be taken into account in the evaluation of the message. Thus, it may be specified for example that an emergency vehicle may only request a traffic light system at a crossroads to switch to "green" when the vehicle moves in the direction towards the crossroads.

BRIEF DESCRIPTION OF THE DRAWINGS

An embodiment example will now be explained in conjunction with the drawings, wherein.

DETAILED DESCRIPTION

Figure 1:
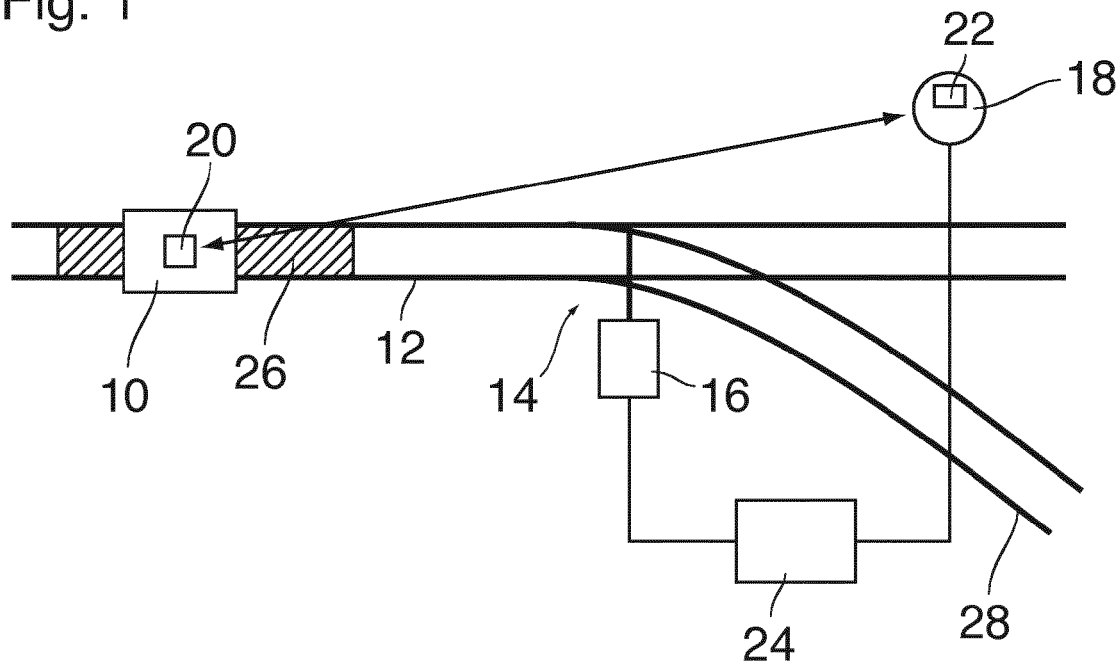
FIG. 1 is a plan view of an apparatus according to the invention disposed at a points for rail vehicles.

In FIG. 1, there has schematically been shown vehicle 10, e.g. a tram, which moves on a track 12 and approaches points 14. When the vehicle 10 is within a certain distance range ahead of the points 14, it shall be possible to transmit, from the vehicle 10, a command for actuating (shifting) the points 14 to a points adjusting device 16. To that end, a base 18 has been installed at a fixed location relative to the points 14, and the base includes a transceiver for transmitting and receiving radio signals. A transponder 20 is mounted at or within the vehicle 10 for wireless communication with the base 18 as has been indicated by a double arrow in FIG. 1.

For example, the base 18 may be configured so as to periodically send signal pulses that will be received by the transponder 20 when the vehicle 10 is within the reception range for the signals from the base 18. The transponder 20 responds to a signal pulse that it has received by sending, immediately or after a well known, preferably short delay time, a response signal to the base 18. The transponder 20 may be a passive transponder which obtains the energy that is necessary for sending the response only from the radio signal that is sent by the base. However, the transponder may as well be an active transponder which has its own voltage supply.

The base 18 includes a measuring device 22 for measuring the signal run time from the time the signal pulse is sent to the time the response from the transponder is received. On the basis of the speed of light and the known response delay time, the distance between the transponder 20 and the base 18 may be calculated from the signal run time. Since the route of the vehicle 10 is determined by the track 12, this distance may directly be associated with a specific location along the track 12.

When the conductor of the vehicle 10 wishes to change the shift position of the points 14, he inputs a corresponding actuating command into the transponder 20, which will transmit this command to the base 18 together with the response to the radio signals received from the base. Optionally, the actuating command, may be included in a plurality of responses of the transponder to successive signal pulses.

The base 18 transmits the actuating command together with the related distance information to an evaluation system 24 which essentially consists of an electronic data processing system and may optionally be integrated in the base 18. Optionally, the transformation of the distance information into position information along the track 12 may take place in the evaluation system 24. Moreover, the evaluation system 24 stores data that specifies a certain zone 26 along the track 12 (hatched in FIG. 1) within which it is admissible to issue a points actuating command. Then, the evaluation system 24 will check whether the transponder 20 was located within this zone 26 at the moment the command had been issued, and in this case the actuating command will be relayed to the points adjusting device 16.

The base 18 may also be used for more extensive communication with the conductor of the vehicle 10. For example, if the actuating command has not been executed, the evaluation system 24 may transmit to the conductor of the vehicle 10, via the base 18, a corresponding message indicating also the reason why the command has not been executed. Optionally, this communication route may also be used for communication between the conductor of the vehicle 10 and a control centre. Likewise is it possible to use the measuring device 22 for continuously locating the vehicle 10 as long as it is within the signal reception range of the base 18.

Since the exchange of signals between the base 18 and the transponder 20 is periodic, the change of the measured distance may also be tracked from cycle to cycle. This permits to determine the direction of travel of the vehicle 10. The decision in the evaluation system 24 as to whether or not the adjusting command is transmitted further may therefore also be made dependent upon the direction of travel of the vehicle.

Figure 2:
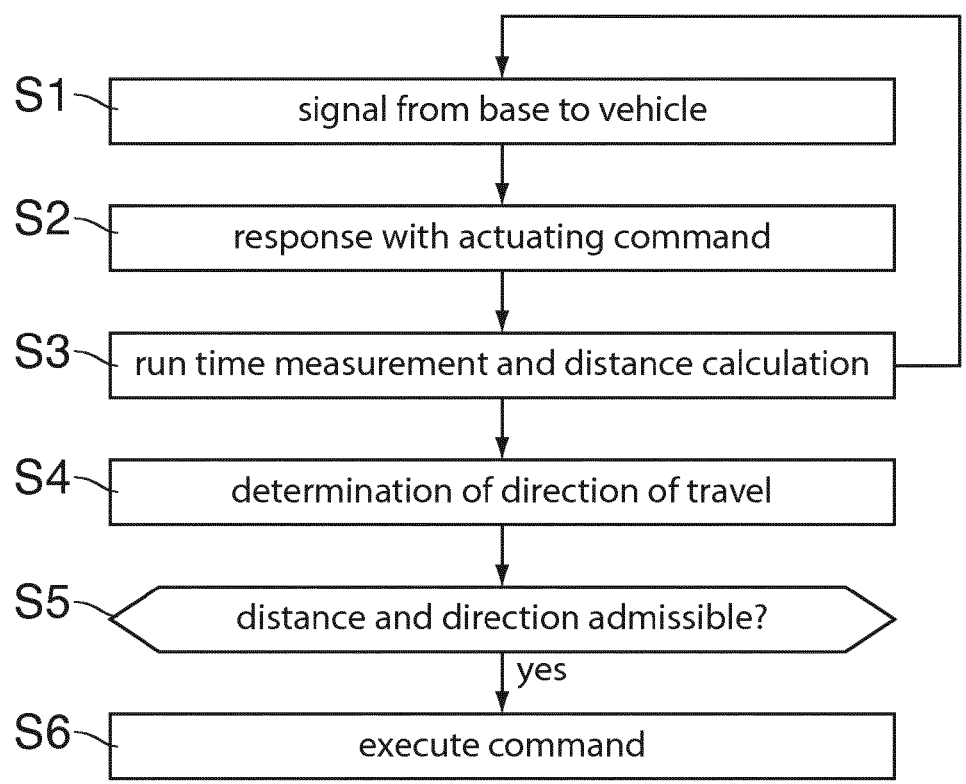
FIG. 2 is a flow diagram illustrating the operation of the apparatus shown in FIG. 1.

The communication sequence that has been described above has been illustrated in a flow diagram in FIG. 2. In step S1, a single pulse is sent from the base 18 to the transponder 20. In step S2, the transponder 20 sends a response signal back to the base 18. If the conductor of the vehicle 10 has given an actuating command, the response will also include this actuating command. In step S3, the measuring device 22 measures the signal run time and calculates the current distance to the transponder 20. The steps S1 to S3 are repeated periodically. The measured distances and the actuating command are relayed to the evaluation system 24. On the basis of the changes of the distance, the evaluation system 24 determines the direction of travel of the vehicle 10 in step S4. In step S5, the evaluation system 24 checks whether the vehicle moves towards the points 14 and whether the measured distance is within the distance range that is specified by the start point and the end point of the zone 26. If this is the case, the actuating command is transmitted further to the points adjusting device 16 in Step S6. If not, the actuating command is ignored or rejected.

The limits of the zone 26 may be modified as desired simply by re-programming the evaluation system 24. The transponder 18 may also communicate with vehicles that approach the points 14 from the opposite direction, not only on the track 12 but also on the track 28 that branches off at the points. On these tracks, zones corresponding to the zone 26 may be specified in which it is admissible to issue commands.

According to a further development of the invention, the distance changes may also be used for measuring the speeds of the vehicles, and the evaluation of the commands or requests may also be made dependent upon the speed.

In another embodiment, a plurality of bases 18 may be installed in the route network such that there is at least a partial overlap between their reception ranges. Then, in the zones of overlap, it is even possible to locate the vehicles in two dimensions by means of triangulation. Thus, the processing of commands or requests may be made dependent, for example, upon the track of a multi-track route or the lane of a road on which the vehicle is located.

Conversely to the principle that has been described above, it is also possible that the communication is initiated by a signal that sent from the vehicle 10 and to which the base 18 responds. In this case, the run time may optionally be measured on the vehicle side and then transmitted to the base.

What is claimed is:

1. Apparatus for transmitting location based messages from vehicles to a stationary infrastructure, comprising:
   at least one transponder installed on a vehicle,
   at least one stationary base in the form of a transceiver for exchanging signals with the at least one transponder,
   a device for measuring run times of the signals and for calculating the distance between the base and the at least one transponder, and
   an evaluation system for evaluating messages contained in the signals from the at least one transponder on the basis of the calculated distance.

2. Apparatus according to claim 1, wherein the transceiver has a range of at least 10 m.

3. Apparatus according to claim 2, wherein the transceiver has a range of at least 100 m.

4. Apparatus according to claim 1, wherein the evaluation system is configured to compare the calculated distance to distance values that specify a predetermined zone along a route of the vehicle.

5. Apparatus according to claim 4, wherein the evaluation system provides an output signal to control a points adjusting device to control travel of the vehicle when the evaluation system determines that the vehicle is within the predetermined zone.

6. Apparatus according to claim 1, wherein the evaluation system is configured to determine a direction of travel of the vehicle on the basis of changes of the calculated distances between the base and the at least one transponder.

* * * * *